US006161524A

United States Patent [19]

Akbarian et al.

[11] Patent Number: 6,161,524

[45] Date of Patent: Dec. 19, 2000

[54] ELECTRONIC CONTROL DEVICE

[75] Inventors: Taghi Akbarian, Köln; Manfred Glöckner, Pulheim; Walter Burow, Bergisch Gladbach; Heinz H. Müller; Harry Klinck, both of Köln, all of Germany

[73] Assignee: Deutz AG, Cologne, Germany

[21] Appl. No.: 09/245,673

[22] Filed: Feb. 8, 1999

[30] Foreign Application Priority Data

Feb. 10, 1998 [DE] Germany ........................... 198 05 299

[51] Int. Cl.[7] ............................ F02M 51/00; F02M 7/00; G06F 19/00

[52] U.S. Cl. ........................... 123/478; 123/436; 701/102

[58] Field of Search ..................................... 123/436, 478; 73/116, 117.3, 118.1; 701/101, 102, 103, 104, 114, 115

[56] References Cited

U.S. PATENT DOCUMENTS

| | | | |
|---|---|---|---|
| 5,048,481 | 9/1991 | Chan et al. | 123/333 |
| 5,284,116 | 2/1994 | Richeson, Jr. | 123/425 |
| 5,392,642 | 2/1995 | Tao | 73/117.3 |
| 5,445,128 | 8/1995 | Letang et al. | 123/436 |
| 5,477,827 | 12/1995 | Weisman, II et al. | 123/436 |
| 5,647,317 | 7/1997 | Weisman, II et al. | 123/299 |

OTHER PUBLICATIONS

Diesel Injection Technology (pp. 134–141) by Bosch Company VD1–Verlog, Jun. 1993 and English translation (18 pages)*.

*Primary Examiner*—Henry C. Yuen
*Assistant Examiner*—Mahmoud Gimie
*Attorney, Agent, or Firm*—Charles L. Schwab; Hardaway/Mann IP Group

[57] ABSTRACT

Electronic control device for single-cylinder or multicylinder autoignition reciprocating internal combustion engines/motors, wherein fuel is suppliable to the given combustion space by use of an injection valve and an injection pump, the injection pump exhibiting a control rod by displacement of which the fuel injection quantity is changeable, an actuator controlled by a control unit further engaging with the control rod, and the control unit being in operative connection with engine sensors, pickups and/or further actuators and, if and to the extent provided, with service (e.g., vehicle) pickups and/or displays and/or controls and/or actuators via inputs and outputs. The representation of a modular concept with a wide range of variation is to are changeable via the number and/or the allocation and/or the signal mode of the inputs and/or outputs.

10 Claims, 3 Drawing Sheets

ELECTRONIC CONTROL DEVICE

TECHNICAL FIELD

This invention relates to an electronic control device for single-cylinder or multicylinder autoignition reciprocating internal combustion engines/motors, wherein fuel is suppliable to the given combustion space by use of an injection valve and an injection pump.

BACKGROUND OF THE INVENTION

An electronic control device for autoignition reciprocating internal combustion engines is described on pages 134 to 139 of the book "Diesel Injection Technology" by the Bosch company, VDI-Verlag, June 1993. This control device is, however, tailored to the use of a diesel engine in a commercial vehicle and does not exhibit the desired versatility.

OBJECTS AND SUMMARY OF THE INVENTION

It is an object of this invention to create an electronic control device that is suitable both for a variety of engines and a variety of injection systems and for a variety of applications of the engine, such as construction machinery, compressors, equipment, agricultural machinery and tractors, and industrial trucks. Hence it follows that the electronic control device is to be operated with and without service pickups and so forth. What is more, the control characteristic is to be adaptable to a variety of applications. Moreover, additional safety and fail-safe circuits or operations are desirable for the varied services in combination with, in part, very rough operation.

By virtue of the fact that the number and/or the allocation and/or the signal mode of the outputs and inputs are alterable, one control unit can be used for all application cases. The versatility is achieved by virtue of the modular concept and the variation of the inputs and outputs.

Once the engine and service equipment have been identified, the control unit is adapted to these conditions in terms of software and appropriately programmed.

For adaptation to a variety of applications, the control unit according to the invention has various speed control modes, for example variable-speed control, fixed-speed control, min/max control, and so forth, which are in part known from mechanical speed governors. The possibility exists of switching over between the various speed control modes so that, for example, the engine in an agricultural machine or a tractor has a different type of control for road travel than for operation of the agricultural machine or the tractor in the field, where, for example, the agricultural machine or accessories are driven at a constant speed via the power takeoff shaft of the tractor. This switchover can, however, also be accomplished automatically, for example through the service pickups or control systems. A fixed setting is possible upon initial starting of the engine after its fabrication, or also later by use of a computer, for example a laptop, via data interfaces of the control unit. Further, this switchover can be accomplished manually via controls connected to the control unit. It should be pointed out that the setting/switchover of the control unit via the data interfaces, the controls, or automatically via pickups or control systems can also find use with reference to the other adjustment or correction capabilities to be described in what follows. The term "control systems" denotes service systems with control units such as transmission control unit, hydraulic control unit and the like, which are connectable to the electronic control device via a suitable interface, for example the CAN (CAN =Controller Area Network) interface, and can communicate with the said electronic control device, direct action of the operator on the engine or the electronic engine control device being made unnecessary under certain conditions.

The prevention of overspeeds takes on great importance in connection with the various applications. To this end, the speed of the motor is continuously monitored and compared with the maximum permissible speed. Provision is also made for connecting a second speed controller to the control unit. The fuel quantity or the control rod position is determined via the control rod travel pickup and compared with the nominal fuel quantity or the nominal control rod position. A calculation based on these data then determines whether the engine is in overrun operation, for example because in downhill movement the overrunning torque of the vehicle is greater than the braking torque of the engine. If the control unit ascertains that overrunning exists, then upon an overspeed, the control rod is set to zero delivery via the actuator on the control rod, an engine brake further being activated if appropriate and a warning signal being given to the operator of the vehicle, for example by lighting a warning lamp. In addition, a message containing the operating states of the engine is stored in a monitor memory. Because overspeed in overrun operation is permissible within certain limits, a controller injection quantity is again released when the engine is in the permissible speed range. If, both in overrun operation and in other overspeed conditions, it is determined that the control rod cannot be set to zero delivery via the actuator, a further shutoff mechanism, for example a lifting magnet, can be activated or deactivated, the control rod being shifted into zero delivery position by such mechanism or by a spring force.

Additional safety is also guaranteed by virtue of the fact that two circuit elements are connected in series in the circuit of the control rod actuator, one circuit element being used by the control unit when the actuator is in normal adjustment and the second circuit element being controlled by (among other features) the overspeed protection circuit, so that the control rod can be placed in a zero delivery position even when incorrect control signals indicating normal functioning of the control unit are being supplied to the actuator.

In order to adapt the torque band or torque curve of the engine to various applications, it is proposed according to the invention that a desired torque band or a torque band favorable for a certain application be identified within the maximum permissible torque band of the engine and programmed into the control unit. Then, on the test stand (the other steps could be carried out previously), the engine is brought to some selected torque points and the control rod positions or injection quantities appropriately corrected if necessary. The entire torque adjustment and correction process can take place automatically through cooperation of the test-stand device with the electronic control device. The control rod positions lying between the selected points are then adapted on the basis of the torque curve according to the corrections at the selected points, and this torque band is stored. Many arbitrary torque bands advantageous for certain applications can be specified or adjusted within the maximum permissible torque band of the engine. In this way, a relatively flat torque curve can be realized, a large increase in torque can be set between the rated speed and the speed at maximum torque, and the like. The engine can be switched between the stored torque bands, for example via a control, while in operation. The switchover can also be accomplished automatically as a function of engine or service pickups or control systems. The initial adjustments are not, however, to be altered by the alteration of the torque curve and the adjustment of the injection quantity based thereon, because these depend on other conditions, such as temperatures and the like.

It is further proposed according to the invention to alter in arbitrary fashion the degree of proportionality of the controller, also called the offset factor. The offset factor defines the increase in engine speed at zero load compared with full load for a specified engine speed according to the equation $$Offset\ factor = \frac{n_{no\ load} - n_{full\ load}}{n_{full\ load}}$$

Because the electronic control device is designed for an offset factor near zero, it is possible on the basis of a particular embodiment to realize a wide range of offset factor variants. For this purpose, first, the load condition of the engine (instantaneous torque or control rod position and speed) is determined at the instantaneous operating point in effect; then, with the desired offset factor, a speed deviation is calculated with the above equation. Next, the nominal speed is corrected in accordance with the calculated speed deviation, and the electronic control device is driven with the corrected nominal speed value. The uncorrected nominal speed can be a setpoint arbitrarily changed, for example by the operator, or also one and the same nominal speed that is subject to effects of load variations. The offset factor, which changes via the engine speed in the case of mechanical governors, can be held constant throughout the speed range. A speed-varying offset factor can, however, also be conceived and the offset factor caused to vary in a definite way as a function of speed.

According to the invention, switching between the several offset factors is possible by use of a control. They can, however, also, as previously described, be set to a fixed value upon initial starting of the engine or at arbitrary values at other times, for example via the data interface.

The electronic control device advantageously makes it possible to perform a plurality of safety actions, for example in order to keep the engine in operational condition, if the control rod travel pickup or the charge air pressure pickup or service pickups and devices cease to function.

In order to replace the information of the control rod travel pickup according to the invention, the variation of the flow rate at the control rod actuator and the variation of the engine charge air pressure, if such a charge air pressure pickup is available, can be determined and used as the replacement for the control rod travel pickup. In addition, the atmospheric pressure and/or the engine coolant temperature can be employed as replacement quantities or further auxiliary control variables.

If the charge air pressure pickup ceases to function or also if none is present in the case of a supercharged engine, the charge air pressure pickup signal can be replaced, according to the invention, by storing the variation of the control rod travel as a function of speed when the engine is operated as a normally aspirated engine, and immediately releasing the fuel injection quantity or the control rod travel corresponding to the injection quantities for the normally aspirated engine when the load is imposed and/or the speed changes, while the fuel injection quantity over and above this quantity, which corresponds to the additional injection quantity of the supercharged engine, is released in accordance with a speed-dependent time function. The speed-dependent time function here corresponds to the increase in rotation speed of the charger, in particular turbocharger, and the charging of the engine through provision of a larger quantity of air. The speed-dependent time function can be varied through various parameters, in particular speed-dependent parameters, so that, over and above the fuel injection quantity of the normally aspirated engine, there are increases in the fuel quantity, which have various slopes and vary as a function of, for example, the speed. When the engine is in the supercharging range, not only the control rod travel corresponding to the quantity for the normally aspirated engine, but a greater travel corresponding to the quantity of the supercharging range, is immediately released upon imposition of load or a change in speed.

When the engine is operated in, for example, an agricultural tractor, the operator's wishes are taken into account through, for example, the vehicle controls (throttle pedal position, transmission setting, etc.), which wishes are conveyed to the electronic engine control device via the service pickups and/or service systems with control units. These devices can, however, cease to function during engine starting because, for example, of the battery voltage being too low. The engine must remain serviceable and operable when these control variables are not present, even in case of damage to the cable harness. For this reason, according to the invention, only the engine sensors, pickups and so forth are used during engine starting, and the service pickups are monitored. Monitoring limits or response thresholds can be varied arbitrarily. Service information is monitored continuously, so that an emergency running program can be executed even if the service information is not present, so that the tractor can be driven, for example, to the shop.

According to the invention, the electronic control device can also release temperature-dependent and time-dependent additional power if the motor design permits this in the service case in question. The release of additional power takes place in dependence on the engine operating temperature, and the level and/or duration of the additional power can depend on the operating temperature. The release of additional power can further be dependent on the previous engine operating mode (i.e., on the engine load or on the charge air pressure or the charge air temperature, the atmospheric pressure and the ambient temperature) or on the exhaust temperature, and can further take account of the cumulative hours of engine service. The release of additional power can moreover be of a duration and level that depend on the engine speed.

BRIEF DESCRIPTION OF THE DRAWINGS

For the further explanation of the invention, reference is made to FIGS. 1 to 3.

DETAILED DESCRIPTION OF THE INVENTION

Figure 1:
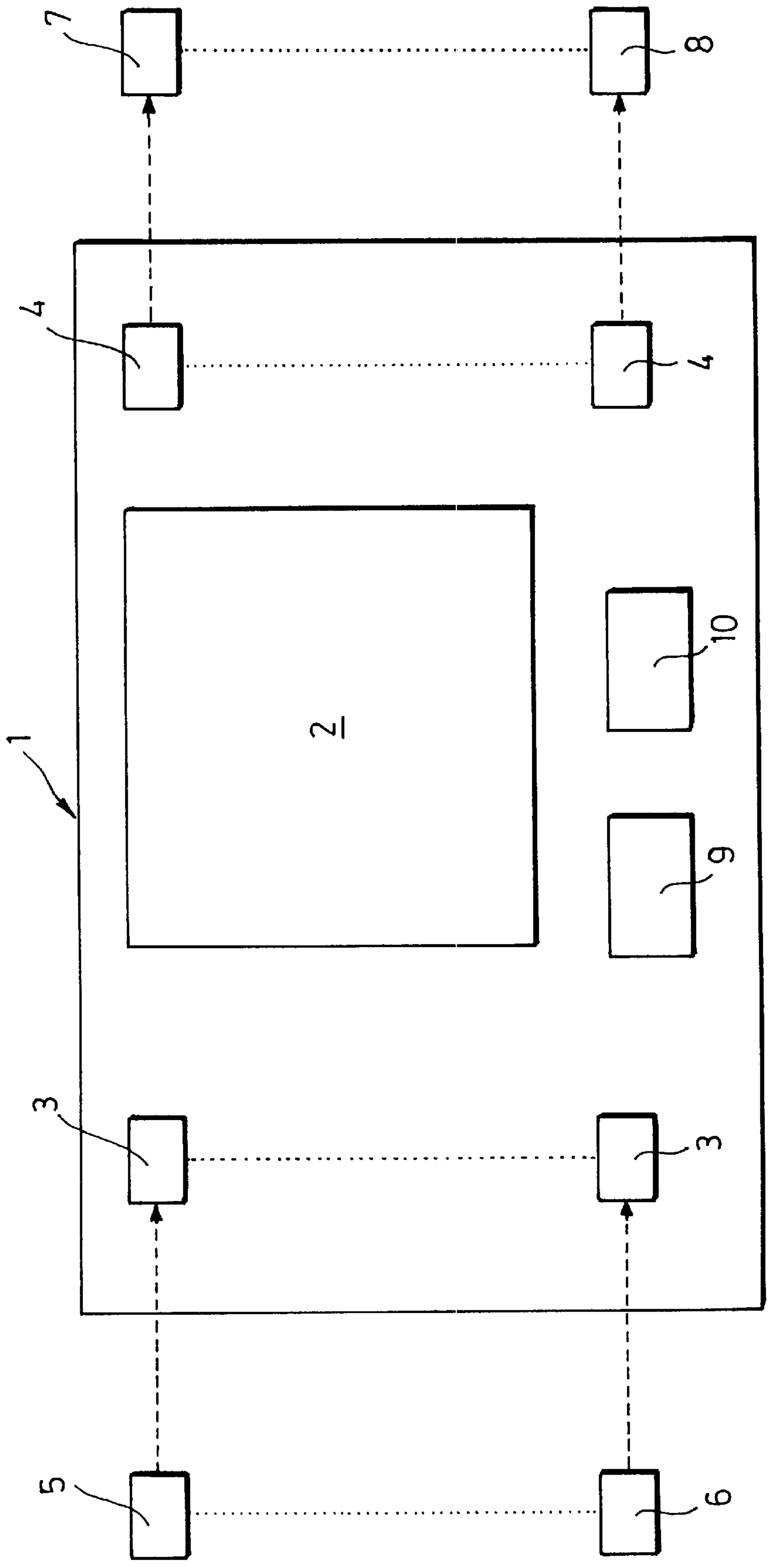
FIG. 1 shows a schematic representation of the electronic control device with inputs and outputs.

In FIG. 1, the numeral 1 denotes in general an electronic control device that has at least a control unit 2, inputs 3 and outputs 4. The inputs 3 can be connected to engine sensors and/or pickups 5 as well as service pickups and/or controls 6; the outputs 4 can be connected to engine controls 7 and service displays and/or controls 8. Further, the electronic control device 1 has at least one diagnostic and programming interface 9 for the retrieval and/or input of data information and the like, as well as at least one data/CAN interface 10, this interface being used for the connection of service systems with control units.

Engine sensors or pickups are, in particular, a control rod travel pickup, speed sensor, temperature sensor or charge air pressure sensor, oil pressure sensor, or also a second speed sensor. Engine controls are, in particular, the control rod actuator and, if appropriate, a shutoff mechanism, for example a lifting magnet. Service pickups are, in particular, the accelerator pedal and/or a manual throttle lever, the start/stop key switch, or a control for changing engine functions. Service displays and/or controls are, in particular, torque/speed displays and alarm displays or malfunction lights.

It is very important that the control unit 2 of the electronic control device 1 be usable for various engines and for various applications, such as vehicular service, service in construction machinery, in equipment, and with and without service interfaces.

Both analog and digital or pulse-width-modulated signals can be employed. First, therefore, the number and configuration and the signal mode of the inputs and outputs are configured, and then the control unit is programmed appropriately to the inputs and outputs. In this way, various options with regard to the functions and the connector pinouts are obtained.

Figure 2:
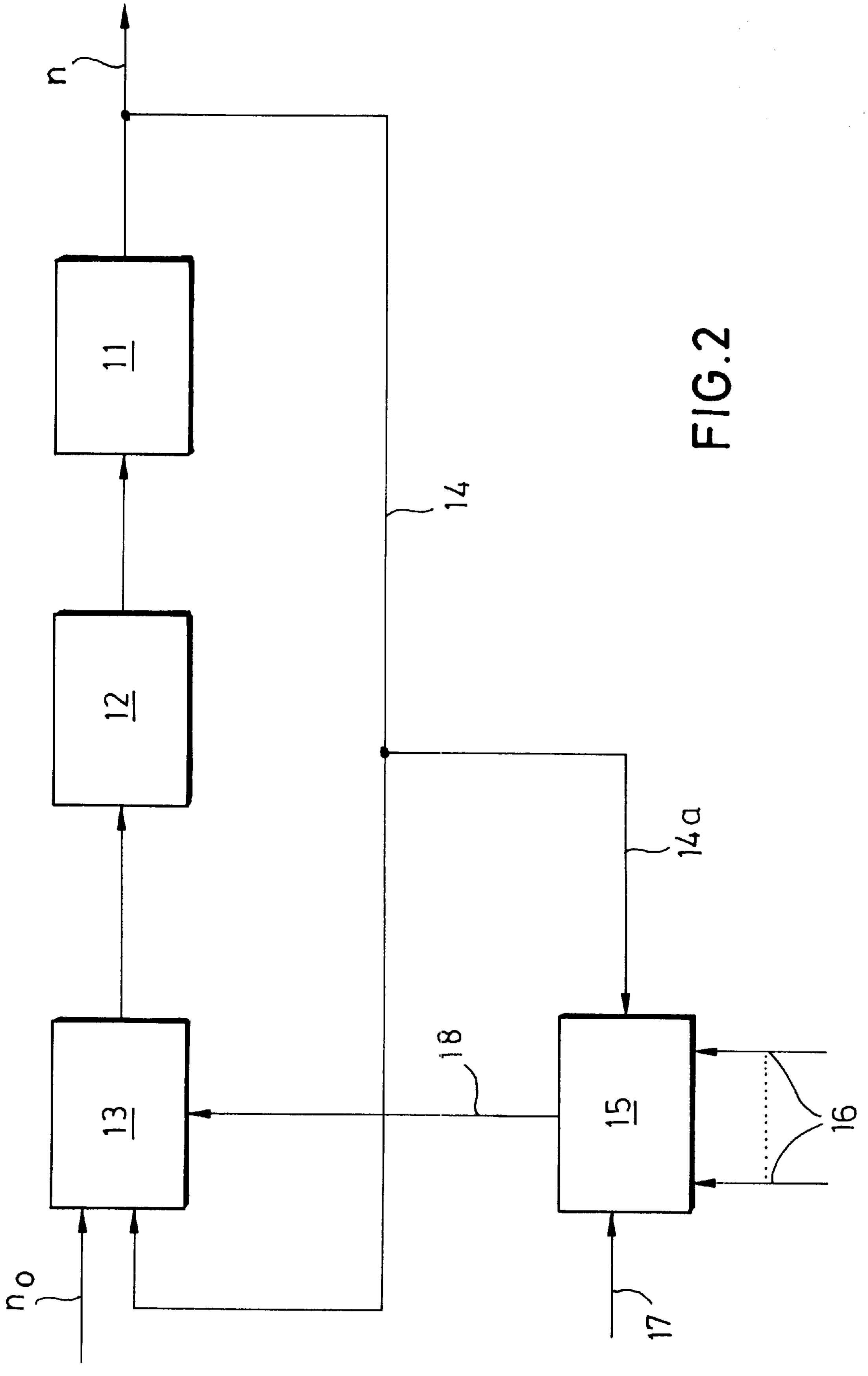
FIG. 2 shows a circuit diagram of the control device.

Moreover, as already explained in the general description, various speed control modes can be specified, these being specifiable via initial programming after the fabrication of the engine or also specifiable or switchable in various ways during operation. Moreover, the controller parameters of the control device used can be continuously adjusted and adapted during engine operation in dependence on engine operating variables and service condition variables. On this point reference is made to the sketch of FIG. 2, where the engine is labeled 11, the control rod actuator 12, and the control device 13. The arrow pointing to the right out of the engine shows the actual speed n, while the free arrow leading to the control device 13 and labeled no gives the nominal speed. In the controller 13, further, a signal representing the instantaneous actual speed of the engine is provided via the line 14. The numeral 15 symbolizes the control parameters, to which the actual speed in signal form is also furnished via the line 14*a*. Engine operating quantities such as speed, load, temperature and so forth are supplied for processing via the arrows 16 entering from below, while operating conditions such as starting, static condition, dynamic transition, guidance and disturbance variables are provided to the controller parameter as symbolized by the arrow 17. The control device 13 is continuously adapted to current conditions via the control parameters, as indicated by the arrow 18, while the control parameters in turn are altered by the engine operating characteristics and the operating conditions.

The electronic control device 1 can be connected to service control systems via the data/CAN interface 10. Sharing of measurements and data with service (equipment) control units is possible via this interface. In this way, service pickups or controls 6, connected to inputs 3 in FIG. 1, can cease to function, for example because the operator is not controlling the engine via the throttle pedal but the throttle pedal is connected to the transmission control or hydraulic control of the service control unit and the service control unit is passing corresponding signals on to the electronic control device.

Figure 3:
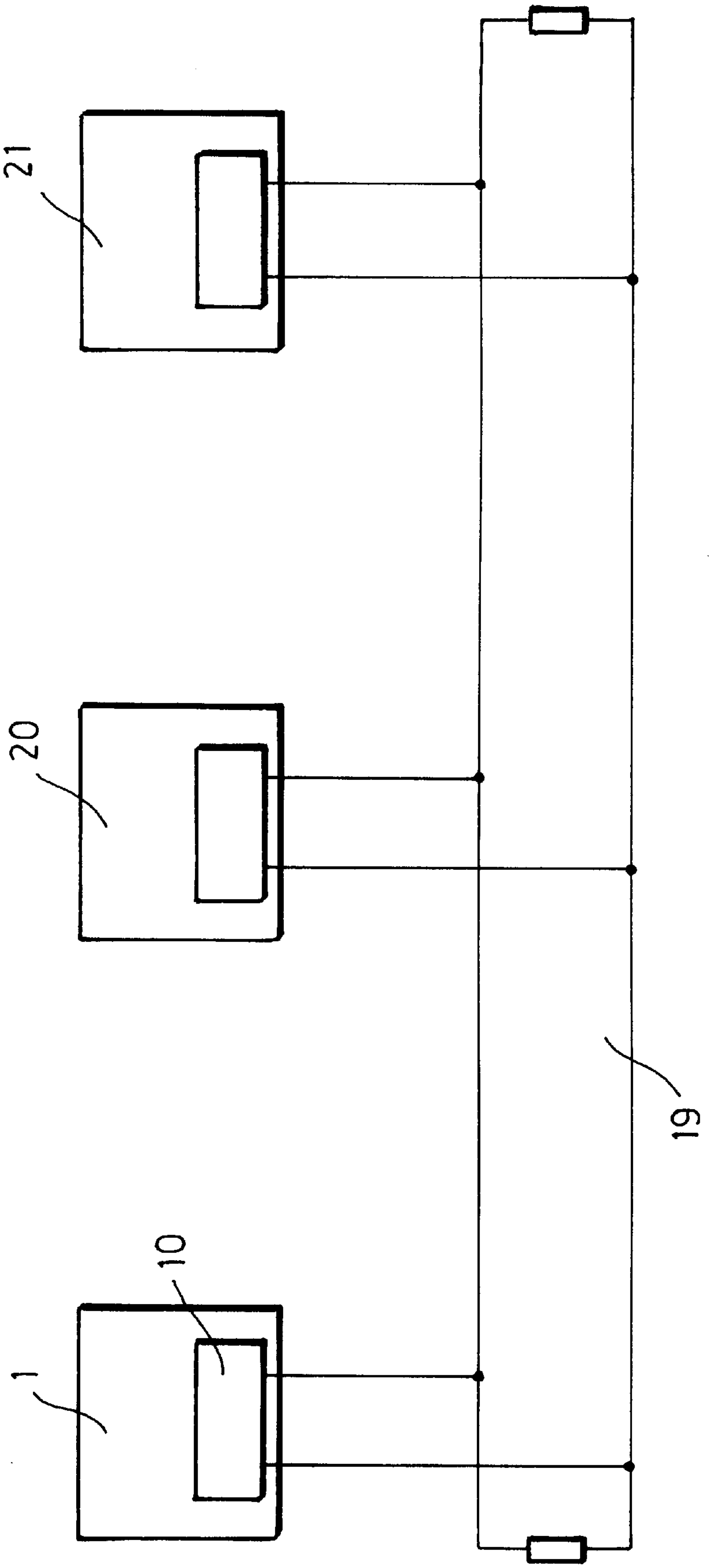
FIG. 3 shows a circuit diagram with the connection of the service control systems to the electronic control device.

In FIG. 3, the numeral 1 denotes the electronic control device, which is connected to the service control units 20 and 21 via the CAN interface 10 and an interface cable identified as 19.

What is claimed is:

1. An electronic control device suitable for controlling operation of a variety of autoignition reciprocating internal combustion engines used to power various equipment, said engines being of the type wherein fuel is delivered to at least one combustion chamber by use of an injection valve and an injection pump, the injection pump having a control rod by displacement of which the fuel injection quantity is changeable and a control rod actuator, said electronic control device comprising:

an electronic control unit having inputs adapted for connection with engine operational sensors, service pickup and manual controls, at least one output connectable to a visual display and an output connected in controlling relation to said control rod actuator, said electronic control device being programed to control operation of a variety of engines and to control said engines in a variety of power supplying applications of said engines, said electronic control unit including stored engine torque curves for various engines and various power supplying applications of said engines and control means for causing said electronic control unit to select the appropriate torque curve for a selected engine and a selected power supplying application.

2. The electronic control device of claims 1, wherein said control unit is adapted to the specification of signal modes, inputs and outputs and the configuration and activation of said inputs and outputs is accomplished by programming of said control unit.

3. The electronic control device of claim 1 wherein said control unit includes a plurality of speed control modes including variable-speed control, fixed-speed control, and minimum/maximum speed control.

4. The electronic control device of claim 3 wherein said speed control modes are arbitrarily selectable by a manually actuated control.

5. The electronic control device of claim 3 wherein said control unit has controller parameters which are adjustable for the optimal adjustment of said control device in dependence on at least one of a group of engine operating variables including speed, load and temperature and in dependence on at least one of a group of operational condition variables including starting, static condition, dynamic transition, steering, disturbance variables, speed and fuel quantity limiting and wherein adjustment of said controller parameters takes place continuously during engine operation.

6. The electron control device of claim 3 wherein various engine speed and memory functions are selectable within a speed control mode by an input from a control system from a group of control systems including manual control systems and service control systems.

7. The electronic control device of claim 1 wherein said control rod actuator is controlled by an electric circuit including at least two circuit control elements arranged in series in said electric circuit and wherein one of said circuit control elements is actuated in response to a predetermined overspeed condition.

8. The electronic control device of claim 1 wherein said control means permits an operator to switch engine operation from one stored torque curve to another stored torque curve during operation of said engine.

9. The electronic control device of claim 1 wherein said electronic control unit is programed for use in controlling operation of engines having different fuel injection systems.

10. The electronic control device of claim 1 wherein said control means automatically switches engine operation from one stored torque curve to another stored torque curve in response to a predetermined engine operating condition.

* * * * *